United States Patent [19]

Norback

[11] Patent Number: 4,699,635
[45] Date of Patent: Oct. 13, 1987

[54] METHOD AND DEVICE FOR REGENERATION OF AN EXCHANGER BODY

[75] Inventor: Per G. Norback, Lidingo, Sweden

[73] Assignee: AB Carl Munters, Sweden

[21] Appl. No.: 835,266

[22] Filed: Mar. 3, 1986

[30] Foreign Application Priority Data

Mar. 15, 1985 [SE] Sweden .............................. 8501290

[51] Int. Cl.⁴ ...................... B01D 53/26; B01D 53/04
[52] U.S. Cl. ......................................... 55/33; 55/35;
                                       55/59; 55/208; 55/387
[58] Field of Search .................. 55/31, 33, 34, 35, 59,
                            55/60, 62, 180, 181, 208, 387, 390

[56] References Cited

U.S. PATENT DOCUMENTS

| | | | |
|---|---|---|---|
| 2,621,752 | 12/1952 | Riley | 55/33 X |
| 2,739,664 | 3/1956 | Parks | 55/33 |
| 2,801,706 | 8/1957 | Asker | 55/33 |
| 3,306,841 | 2/1967 | Ward | 55/62 X |
| 3,365,859 | 1/1968 | Sandberg | 55/62 X |
| 3,436,839 | 4/1969 | Ellington | 55/33 X |
| 3,710,547 | 1/1973 | Nelson | 55/62 X |
| 4,516,985 | 5/1985 | Winter | 55/59 X |

FOREIGN PATENT DOCUMENTS

| | | | |
|---|---|---|---|
| 562184 | 6/1960 | Belgium | 55/31 |
| 366885 | 2/1932 | United Kingdom | 55/59 |

Primary Examiner—Robert Spitzer
Attorney, Agent, or Firm—Curtis, Morris & Safford

[57] ABSTRACT

Method and apparatus for regeneration of a stationary exchanger body in which a useful gas is caused to pass from an inlet (16) to an outlet (16), the useful gas being dehydrated in the exchanger body. The exchanger body has a moisture absorbing ability and is regenerated by means of a regenerating gas which is caused to pass through the exchanger body alternately with the useful gas. During the regeneration of the exchanger body a regenerating gas is introduced into the exchanger body through both the inlet and the outlet and removed from the interior of the body via a space, which communicates between the interior of the body and a separate outlet, through which the regenerating gas is sucked out from the space.

8 Claims, 4 Drawing Figures

METHOD AND DEVICE FOR REGENERATION OF AN EXCHANGER BODY

The present invention relates to a method and a device for regeneration of a stationary exchanger body which has moisture absorbing ability and within which a useful gas which is to dehydrated is caused to pass between an inlet and an outlet in the body, the exchanger body then being regenerated by a regenerating gas being caused to pass the body alternately with the useful gas. The invention also relates to a device for carrying out the method.

When dehydrating moist air, for example, this so-called useful air is conducted through the exchanger body which is made of a material which in itself has moisture absorbing properties or which is covered or impregnated with a hygroscopic substance as a drying medium.

The drying meduim must be regenerated at certain intervals as the moisture absorption of the exchanger body decreases, whereby the moisture taken up by the hygroscopic material or layer is removed. This is effected thereby that the flow of useful gas through the exchanger body is interrupted and a regenerating gas, hereinafter called reg.gas, is brought to pass through the exchanger body. The reg.gas, which usually consists of preheated air—is suitably conducted in countercurrent to the direction of flow of the useful gas—through the exchanger body until the absorbed moisture has been removed from the body.

The circulation of reg.gas through the body is effected by means of a separate circulation system which is connected to the inlet and the outlet of the exchanger body and thereafter carries the moisture containing reg.gas away to the outdoor air or a possibly existing condenser. The change between the stream of useful air and the stream of reg.gas in the exchanger body is normally effected by means of dampers or the like which are adjustable so as to permit the stream of gas to be supplied optionally to the exchanger body and thereupon be brought to be conducted to the space to be dehydrated or away from the same. However, this circulation system and dampers make the function of the drying apparatus complicated and affect its reliability in operation and render its construction more expensive, which are drawbacks which especially become apparent in connection with small drying apparatus which otherwise have a simple construction.

The main object of the invention is, therefore, to bring about a method for regeneration of an exchanger body, with which the aforementioned drawbacks are avoided, and a device for carrying out the method which is very simple and cheap as to its construction.

These and other objects of the invention are achieved thereby that the method and the device according to the invention have received the characteristic feature stated in the subsequent claims.

The invention and the objects and purposes thereof will be described better in the following in connection with the drawings which show preferred embodiments of devices for carrying out the method.

Figure 1:
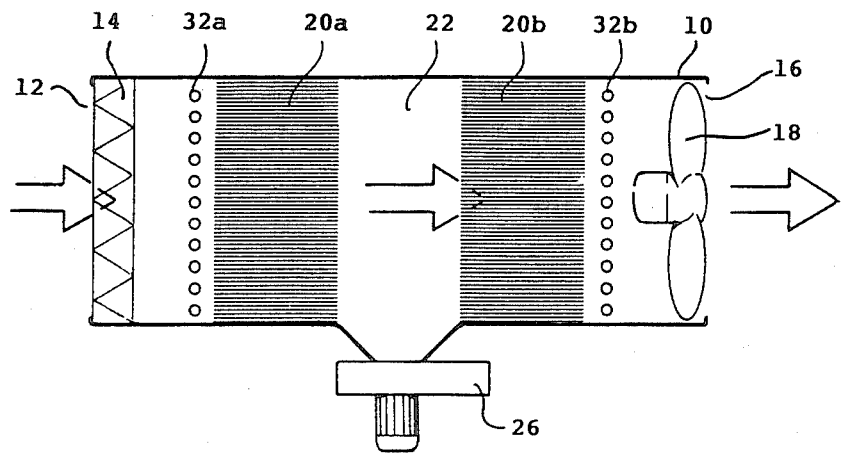
FIG. 1 shows diagrammatically a section through a drying apparatus according to the invention during the drying process.

In the embodiment shown in FIG. 1 the drying apparatus consists of a casing 10 which is closed except for an inlet 12, in which a filter 14 is provided, and an outlet 16, in which a suction fan 18 is located. Mounted inside the casing 10 of the exchanger apparatus is an exchanger body which in the shown embodiment according to the invention is subdivided into two preferably equally sized insert units 20a and 20b.

The two insert units 20a and 20b consist, for example, of alternately plane and folded layers, so that a great number of fine through-channels through which a stream of useful air to be dehydrated can pass. The layers may consist of a carrier material which in itself is not hygroscopic, such as plastics, mineral fibres etc., which is impregnated or coated with a substance having hygroscopic properties, such as a salt, e.g. lithium chloride. The layers may also be of metal, e.g. aluminium which has a surface of alumina as a drying medium. Of course, various other combinations of base material and drying medium are conceivable also.

As is evident from FIG. 1, that two insert units 20a, 20b are disposed with an interspace 22 between each other, through which the air stream passes from the one insert unit 20a over to the other insert unit 20b. Applied in connection with the interspace 22 is a little centrifugal blower 26, the function of which will be described in greater detail below.

In FIG. 1 which shows the drying process in the drying apparatus, the fan 18 is in operation and sucks a stream of useful gas which is to be dehydrated and which is indicated by the double arrows from the inlet 12 via the filter 14 through the left-hand insert unit 20a via the interspace 22 over to the right-hand insert unit 20b and the outlet 16, from which it is conducted to the place of consumption. During the passage through the insert units 20a, 20b the useful air is dehydrated as has been described hereinbefore.

Figure 2:
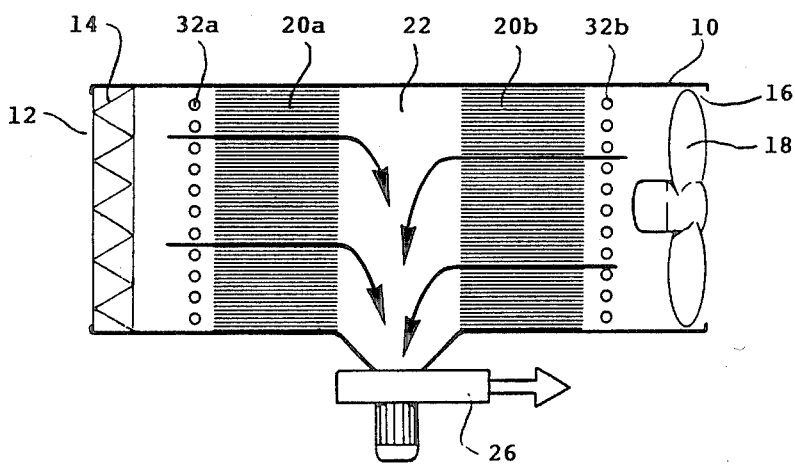
FIG. 2 shows the apparatus according to FIG. 1 during the regenerating process.

When the moisture absorption of the insert units 20a, 20b is reduced by the hygroscopic layer having become saturated with moisture, the fan 18 is shut off, so that the flow of useful air through the drying apparatus is stopped. Instead, the centrifugal blower 26 is started and sucks a stream of preheated reg.gas through both the inlet 12 and the outlet 16, further through the insert units 20a, 20b and via the interspace 22 to the casing of the blower 26 and further to the outlet of the blower 26, which preferably is in connection with the free atmosphere. This process is illustrated in FIG. 2, wherein the same reference numerals have been used for those parts which are common with FIG. 1. The reg.gas consists suitably of preheated air, the course of flow of which is shown by the continuous arrows in FIG. 2, in which the discharge from the blower 26 is denoted with a double-drawn arrow. The preheating of the air is effected by means of heating elements 32a, 32b located in the direction of flow of the reg.air ahead of the two insert units 20a, 20b and which heat the reg.air. prior to the entering thereof into the two insert units 20a, 20b of the exchanger body. The heaters 32a, 32b may be consituted by electric heaters or the like which are switched on when the regeneration cycle is started.

Figure 3:
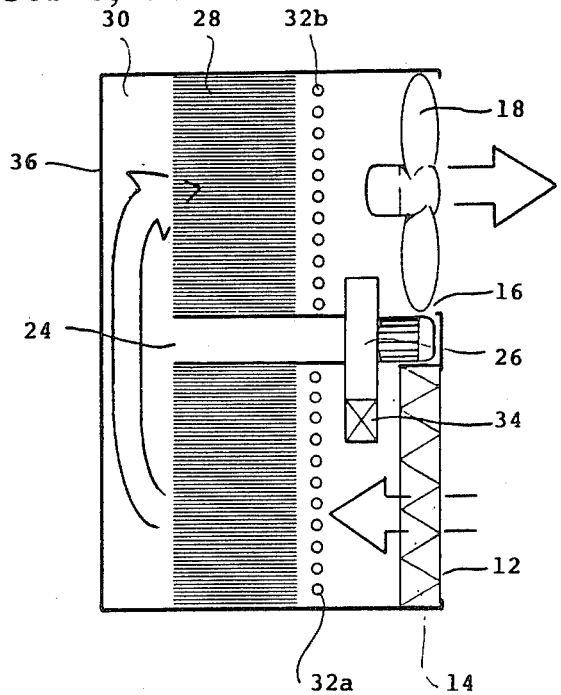
FIG. 3 shows a section similar to FIG. 1 of a modified embodiment of the drying apparatus.
Figure 4:
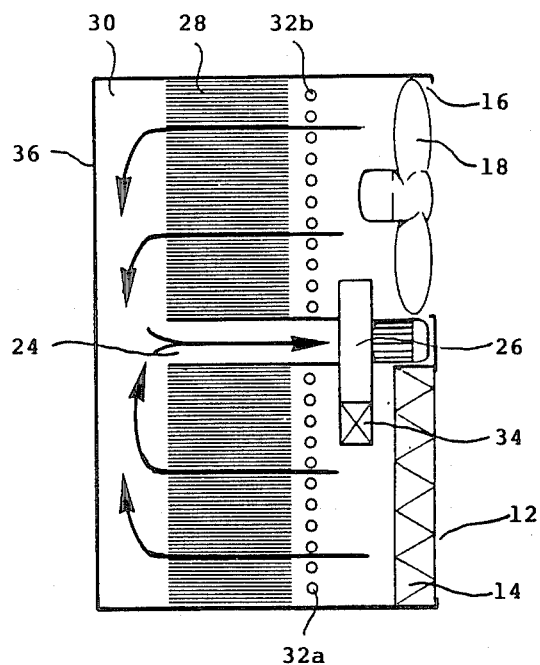
FIG. 4 shows the drying apparatus of FIG. 3 during the process of regeneration.

In the embodiment shown in FIGS. 3 and 4 those parts which are common with the FIGS. 1 and 2 have obtained the same reference numerals. In FIG. 3 one single insert body 28 is arranged in the casing 36, and the interspace 22 in FIG. 1 has its conterpart in the space 30 in FIG. 3. The connection of this space 30 to the blower 26 is effected through a channel or a tube 24 which extends straight through the insert unit 28 and to which the inlet to the centrifugal blower 26 is connected, which blower in this case also has for its purpose to suck preheated reg.gas through the insert unit 28 when the moisture absorbing layers have to be regenerated. With the structure shown in FIG. 3 it is obtained that all electrical equipment is collected on one side of the apparatus as well as the inlet and the outlet for the air to be dehydrated. Moreover the exchanger body can be designed as a single disc.

In FIG. 3 the drying process is shown, wherein the useful gas which is indicated by the double-drawn arrows, is sucked by the fan 18 through the insert unit 28 and supplied to the place of consumption. In the regeneration process which is illustrated in FIG. 4, the fan 18 is stopped and instead, the blower 26 is started in order to suck reg.air which is denoted by the single arrows and which has been preheated by the heaters 32a, 32b through the insert unit 28 to the outlet of the blower 26, as is denoted at 34 in FIG. 4.

As is evident from both the embodiment according to FIG. 2 and the embodiment according to FIG. 4, a regeneration in counter-current takes place for the insert unit 20b or that portion of the insert unit 28 which was situated last in the direction of flow of the useful air and which thus has taken up the lowest quantity of moisture, whereas the other insert unit 20a or portion of the insert unit 28 are regenerated in concurrent flow. This is a matter of convenience, since the insert unit 20a or the portion of the insert unit 28 in consideration are totally charged with moisture, for which reason the direction of flow is a minor importance for the efficiency of the regeneration.

The flow of reg.air is normally considerably smaller than the flow of air to be dried, which results in that the channel system through which the reg.air is removed, has a considerably smaller cross-sectional area than that through which the air to be dehydrated is conducted. The channel system for the reg.air affords, moreover, a considerably greater resistance than that prevailing for the useful air, since the reg.air is to be conveyed away to the outer atmosphere or, if necessary, be caused to pass through a condenser where the moisture is precipitated. This implies that when the fan for the useful air is running and the blower for the reg.air stands still, normally no flap is required which prevents air from streaming backwards through the reg.air circuit into the interspace 22 or channel 24 of the dryer.

It is obvious that the shown and described embodiments are examples only of a realization of the invention and that alterations and modifications can be made within the scope of the subsequent claims.

I claim:

1. A method for regeneration of a stationary exchanger body having gas moisture absorbing means, wherein a useful gas is caused to pass between an inlet and an outlet in the body, the exchanger body being regenerated by a regenerating gas being caused to pass the body alternately with the useful gas, characterized in that the regenerating gas simultaneously is supplied to both the inlet of the exchanger body and the outlet of the exchanger body and is withdrawn from the interior of the body via a space which communicates from the interior of the body to a separate outlet, through which the regenerating gas is sucked out from the space by a blower connected directly at said separate outlet.

2. Method according to claim 1, characterized in that said regenerating gas is preheated prior to entrance into the inlet and outlet of the exchanger body by a first heater located in said inlet of the exchanger body and a second heater located in said outlet of the exchanger body, wherein said first and second heaters are simultaneously energized to preheat said regenerating gas.

3. A device for regeneration of an exchanger body, within which a useful gas is caused to pass from an inlet to an outlet, the useful gas becoming dehydrated in the exchanger body which has gas moisture absorbing means for absorbing moisture from the useful gas, the moisture absorbing means being regenerated by means of a regenerating gas which is caused to pass through the exchanger body alternately with the useful gas, characterized in that the exchanger body comprises at least one insert unit which is enclosed in a casing in such a manner that a space is formed within the casing through which space the gas must pass between the inlet and the outlet and a blower connected to the space for suction out of regenerating gas from the space, which regenerating gas is supplied simultaneously to the inlet and outlet of the exchanger body, wherein said space communicates with a separate outlet and said blower is connected directly at said separate outlet.

4. Device according to claim 3, wherein a first heater and a second heater are positioned within the inlet and outlet, respectively, of the exchanger body for preheating the regenerating gas, said first and second heaters being simultaneously energized to preheat said regenerating gas.

5. Device according to claim 3, characterized in that an insert unit (28) is disposed within a casing (36) with one side arranged with an interspace to a rear wall in the casing, the inlet (12) and the outlet (16) being located on the side opposite to said insert unit and said interspace forming that space through which the air has to pass from the inlet to the outlet, as well as a tube or channel (24) connected to the space (30) and connected with an inlet to the blower (26) for the regenerating gas.

6. Device according to claim 3, characterized in that two insert units (20a, 20b) are located in a cylindrical or tubular casing (10) in succession and filling up the cross-section of the casing, said insert units being separated from one another by an interspace which consitutes said space (22).

7. A device for regeneration of an exchanger body within which a useful gas is caused to pass from an inlet to an outlet, the useful gas becoming dehydrated in the exchanger body which has gas moisture absorbing means for absorbing moisture from the useful gas, the moisture absorbing means being regenerated by means of a regenerating gas which is caused to pass through the exchanger body alternately with the useful gas, characterized in that the exchanger body comprises at least one insert unit which is enclosed in a casing in such a manner that a space is formed within the casing through which space the gas must pass between the inlet and the outlet and a blower connected to the space for suction out of regenerating gas from the space, which regenerating gas is supplied simultaneously to the inlet and outlet of the exchanger body, further characterized in that arranged in the outlet from the exchanger body is a fan for sucking the useful gas through the exchanger body, said fan being arranged to become stopped when the blower for the regenerating gas is started.

8. A device for regeneration of an exchanger body within which a useful gas is caused to pass from an inlet to an outlet, the useful gas becoming dehydrated in the exchanger body which has gas moisture absorbing means for absorbing moisture from the useful gas, the moisture absorbing means being regenerated by means of a regenerating gas which is caused to pass through the exchanger body alternately with the useful gas, characterized in that the exchanger body comprises at least one insert unit which is enclosed in a casing in such a manner that a space if formed within the casing through which space the gas must pass between the inlet and the outlet and a blower connected to the space for suction out of regenerating gas from the space, which regenerating gas is supplied simultaneously to the inlet and outlet of the exchanger body, further characterized in that the insert unit is disposed within the casing with one side arranged with an interspace to a rear wall in the casing, the inlet and the outlet being located on the side opposite to said insert unit and said interspace forming that space through which the air has to pass from the inlet to the outlet, a channel being connected to the interspace and connected with an inlet to the blower for the regenerating gas, additionally characterized in that the blower for the regenerating gas is situated on the same side of the insert unit as the inlet and the outlet and a fan located in the outlet for sucking out the useful gas as well as the heaters for preheatng the regenerating gas, whereby all electrical equipment is collected on this side of the insert unit or casing.

* * * * *